UNITED STATES PATENT OFFICE.

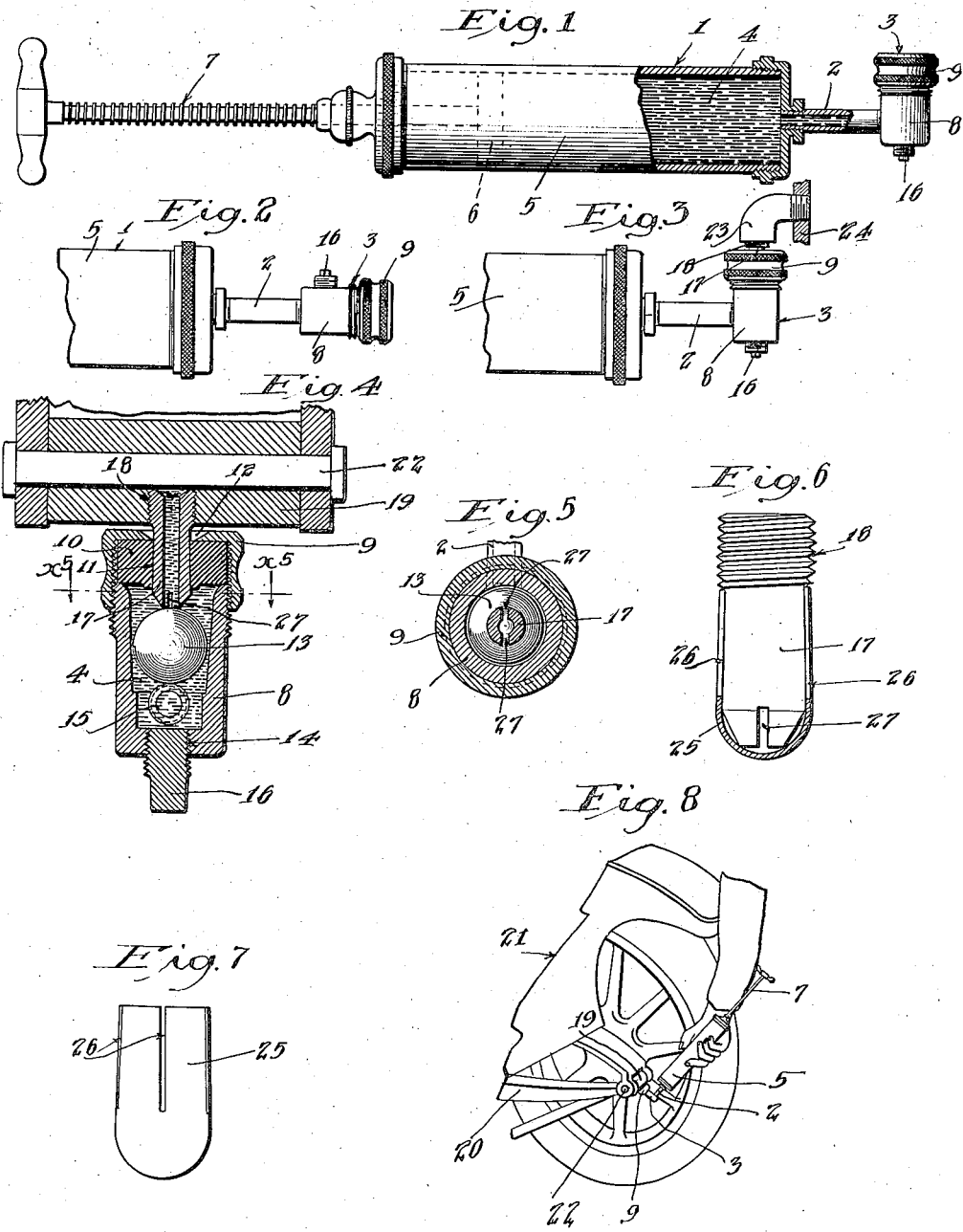

EDWARD COE CRITCHLOW, OF ORCUTT, CALIFORNIA.

LUBRICATING SYSTEM.

1,319,425.  Specification of Letters Patent.  Patented Oct. 21, 1919.

Application filed January 30, 1919. Serial No. 274,061.

*To all whom it may concern:*

Be it known that I, EDWARD COE CRITCHLOW, a citizen of the United States, residing at Orcutt, in the county of Santa Barbara and State of California, have invented a new and useful Lubricating System, of which the following is a specification.

This invention relates to a system whereby bearings or other parts of vehicles or machinery may be readily charged with grease or other lubricant. This system eliminates the use of the ordinary grease cups.

An object of the invention is to facilitate the application of lubricant to the parts which require lubrication.

Another object is to provide a construction which will prevent waste of the grease or other lubricant while the operation of applying the grease is proceeding.

Another object is to provide a construction whereby the nozzle may be readily applied to variously located parts of a vehicle or other machine.

Another object is to provide for a tight and easily made connection between the part requiring lubrication and the lubricant force pump or gun.

Other objects and advantages will appear in the subjoined detailed description.

The accompanying drawings illustrate the invention:

Figure 1 is a side elevation partly in mid section of a lubricating system built in accordance with the provisions of this invention, the nipple for connecting the nozzle with the part to be lubricated, not being shown in this view. The nozzle is shown turned at right angles to the longitudinal axis of the gun.

Fig. 2 is a fragmental elevation of the nozzle end of the gun shown in Fig. 1 with the nozzle assembled differently.

Fig. 3 is a fragmental elevation of the nozzle end of the gun shown in Fig. 1, there also being shown an elbow nipple-extension screw-threaded into the part to be lubricated.

Fig. 4 is an enlarged sectional elevation of the nozzle and the nipple to which the nozzle is applied. This view also shows in section a vehicle spring to which the nipple is attached.

Fig. 5 is a plan section on line indicated by $x^5$—$x^5$, Fig. 4.

Fig. 6 is an enlarged side elevation of the nipple shown in Fig. 4, the spring dust cap being shown in position on the nipple and being in section.

Fig. 7 is a side elevation of the dust cap shown in Fig. 6.

Fig. 8 is a perspective view disclosing the various elements of the system and showing the manner of application of the grease gun to one of the springs of a vehicle.

This invention provides a suitable lubricant force pump or gun 1 connected by a tube 2 with a suitable nozzle 3. The gun 1 may be of any construction capable of forcing the lubricant 4 therefrom through the tube 2 and nozzle 3. In the drawings the gun 1 comprises a cylinder 5 in which works a plunger 6 operated by a screw-threaded stem 7. This type of gun is well known and therefore it is readily understood that turning of the stem 7 in one direction will cause the plunger 6 to move toward the nozzle end of the cylinder 5 so as to bring pressure to bear upon the lubricant 4 to force the same from the gun.

The nozzle 3 is preferably constructed as follows: The nozzle 3 comprises a valve chamber 8 provided at one end with a cap 9 which may be screw-threaded or otherwise secured in place on the valve chamber. Inside of the cap 9 is a flexible or yielding washer 10 preferably of rubber or the like, said washer being provided with a hole 11 registering with a hole 12 in the cap 9. Adapted to seat against the washer 10 so as to normally close the hole 11 is a ball valve 13. The valve chamber 8 is provided with a screw-threaded port 14 in its end wall and with a screw-threaded port 15 in its side wall. Either one of the ports 14, 15 may be closed by a screw-threaded plug 16 and into the port not closed by said plug is screw-threaded the tube 2. This construction enables the nozzle to be assembled on the tube 2 at right angles to the longitudinal axis of said tube, as in Fig. 1, or in such position that the longitudinal axes of the nozzle and tube coincide, as in Fig. 2.

The parts of the vehicle or other machine requiring lubrication are provided with nipples corresponding with that shown at 17 in Figs. 4 and 6 of the drawings. In Fig. 4 the nipple 17 is shown screw-threaded into a hole 18 of a bearing 19 of a leaf spring 20. The spring 20 forms a portion of a vehicle which is fragmentarily shown at 21 in Fig. 8. The shackle bolt of the spring is shown at 22 and lubricant admitted through the nipple 17 lubricates the bearing surfaces of the spring 19 and bolt 22 as is readily understood. Some of the parts of the vehicle or other machine to be lubricated may be in such positions that if the nipple 17 were applied thereto directly the gun 1 could not be used because of interference of other parts of the vehicle. Therefore in some instances an L 23, forming a nipple angle extension as in Fig. 3, may be employed and this L is shown screw-threaded into a member 24 which is to be supplied with lubricant. When the L 23 is employed, the nipple 17 will be permanently screw-threaded into said L. It is understood that each of the parts of the vehicle or other machine to be lubricated will be permanently provided with a nipple corresponding to the one shown in Fig. 4, and that the nipple may be provided with either male or female screw-threads.

Each of the nipples thus provided is normally covered with a dust cap similar to that shown at 25 in Fig. 7. The dust cap 25 is provided at its open end with longitudinally extending slots 26 and the portions of the cap between the slots form more or less resilient fingers so that when the cap is in place on the nipple the cap will resiliently clasp the sides of the nipple and prevent dust from entering the nipple. The outer end of the nipple is provided with laterally extending openings in the form of slots 27 and the utility of these slots will be made clear hereinafter. The cap 25 may be of rubber and the slots 26 omitted.

In practice, the system operates as follows: When it is desired to apply grease to the nipple 17 leading to any particular bearing surface of a vehicle or other machine, the dust cap 25 will be removed and the nozzle 3 will be brought into axial alinement with the nipple 17 and pressure will be applied to the nozzle to force the washer 10 upon the nipple 17. When the washer is thus forced over the nipple said nipple is sufficiently long to project beyond the inner face of the washer 10 so as to displace the ball valve 13 from its closed position against the washer, as in Fig. 4. The operator will then manipulate the stem 7 to bring pressure to bear upon the lubricant 4 and the lubricant will pass through the tube 2, thence through the valve chamber 8 and thence through the slots 27 into the nipple 17 to the parts to be lubricated. It is clear that if it were not for the slots 27 the lubricant could not pass as freely from the valve chamber 8 into the nipple because the ball valve 13 tends to seat against the end of the nipple when the nozzle is in place on the nipple. The slots 27 can be omitted, if desired, and in that event the pressure of the lubricant will be relied upon to force the ball valve 13 away from the nipple 17. The washer fits the nipple 17 tightly and thus prevents leakage of the lubricant around the nipple when the nozzle is in lubricant-applying position.

After the operator has forced the desired quantity of lubricant into the nipple 17, he will withdraw the nozzle 3 therefrom and replace the dust cap 25. When the operator withdraws the nozzle from the nipple, the pressure of the lubricant upon the ball valve 13 moves said valve into position against the washer 10 so as to close the hole 11, thus preventing the lubricant from oozing out of the gun. The operator will then proceed to apply lubricant to other parts of the vehicle in the same manner. In some instances it may be necessary in order to apply the nozzle to the nipple to change the position of the nozzle with reference to the tube 2 and this may be readily done as hereinbefore explained by simply reversing the positions of the tube 2 and plug 16 with reference to the ports 14, 15.

Another way of operating the system is to first produce pressure on the lubricant in the cylinder before the nozzle is applied to the nipple, and this may be done for the reason that the stem is screw-threaded into the cylinder and the ball valve prevents the outflow of the lubricant. After the stem has been rotated to produce the desired pressure upon the lubricant, the nozzle will be applied to the nipple as before, thus opening the ball valve and allowing the lubricant to flow into the nipple. This is quite an advantage as in many instances the stem cannot be handily operated when the nozzle is applied to the nipple and, if the pressure on the lubricant is not produced before applying the nozzle to the nipple, the operator will be required to employ both hands in the operation, one to hold the cylinder and the other to manipulate the stem. This noted advantage could not be obtained if the stem were not screw-threaded into the cylinder but merely reciprocated after the manner of the stems of many ordinary grease gun plungers, and, therefore, I prefer to employ the screw-threaded stem as illustrated in Fig. 1 of the drawings.

From this it is readily understood that my system involves the employment of means to hold the plunger stem in pressure producing position so that the lubricant will be under pressure when the gun is applied to the nipple, these means being the screw-threads of the stem.

I claim:

1. A lubricating system comprising the combination with a nipple projecting from the part to be lubricated, of a lubricant gun provided with a nozzle adapted to be slipped over the nipple, said nozzle having therein a washer adapted to tightly fit upon the nipple.

2. A lubricating system comprising the combination with a nipple projecting from the part to be lubricated, of a valve chamber, a cap for the valve chamber having a hole to receive the nipple, a ball valve in the valve chamber, there being laterally extending openings in the nipple, and means to force a lubricant into the valve chamber.

3. A lubricating system comprising the combination with a nipple projecting from the part to be lubricated, of a valve chamber, a cap for the valve chamber having a hole to receive the nipple, a washer inside of the cap to tightly fit upon the nipple, a ball valve in the valve chamber, there being laterally extending openings in the nipple, and means to force a lubricant into the valve chamber.

4. A lubricating system comprising the combination with a nipple projecting from the part to be lubricated, of a valve chamber having a cap with a hole therein to receive the nipple, a washer inside of the cap to tightly fit upon the nipple, a valve in the valve chamber adapted to be engaged by the nipple to open said valve, a cylinder connected with the valve chamber to hold a lubricant, a plunger for the cylinder, a stem for the plunger, and means to hold the stem with the plunger producing pressure on the lubricant.

5. A lubricating system comprising the combination with a nipple projecting from the part to be lubricated, of a valve chamber, a cap for the valve chamber having a hole to receive the nipple, a ball valve in the valve chamber, there being a communication between the bore of the nipple and the valve chamber when the valve engages the outer end of the nipple, and means to force a lubricant into the valve chamber.

6. A lubricating system comprising the combination with a nipple projecting from the part to be lubricated, of a valve chamber, a cap for the valve chamber having a hole to receive the nipple, a valve in the valve chamber, there being laterally extending openings in the nipple, and means to force a lubricant into the valve chamber.

7. A lubricating system comprising the combination with a nipple projecting from the part to be lubricated, of a valve chamber, a cap for the valve chamber having a hole to receive the nipple, a washer inside of the cap to tightly fit upon the nipple, a valve in the valve chamber, there being laterally extending openings in the nipple, and means to force a lubricant into the valve chamber.

8. A lubricating system comprising the combination with a nipple projecting from the part to be lubricated, of a valve chamber, a cap for the valve chamber having a hole to receive the nipple, a valve in the valve chamber, there being a communication between the bore of the nipple and the valve chamber when the valve engages the outer end of the nipple, and means to force a lubricant into the valve chamber.

Signed at Orcutt, California, this 22nd day of January, 1919.

EDWARD COE CRITCHLOW.

Witnesses:
HUGH AMIDA MATTER,
E. F. EDWARDS.